United States Patent Office 3,728,343
Patented Apr. 17, 1973

3,728,343
SUBSTITUTED 1H-PYRIDO[2,3-b][1,4]THIAZINE-2(3H)-THIONES
Kao Hwang, Highland Park, and James Daniel Ratajczyk, Waukegan, Ill., assignors to Abbott Laboratories, Chicago, Ill.
No Drawing. Filed Oct. 4, 1971, Ser. No. 186,502
Int. Cl. C07d 99/10
U.S. Cl. 260—243 R     2 Claims

ABSTRACT OF THE DISCLOSURE

Novel substituted 1H-pyrido[2,3-b][1,4]thiazines - 2 (3H)-thiones represented by the formula

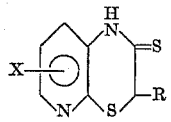

wherein X is hydrogen, hydroxy, mercapto, lower alkyl, lower alkoxy or halo and R is hydrogen, hydroxy, lower alkyl, lower alkoxy or halo. The compounds exhibit anti-inflammatory and anti-secretory activity.

Detailed description of the invention

This invention relates to novel substituted 1H-pyrido [2,3-b][1,4]thiazine-2(3H)-thiones and to methods of treating inflammation and peptic ulcers therewith.

Peptic ulcers are classically treated through the use of antacids, anticholinergic agents and controlled diet. While the antacids provide relief, they are usually taken in dosages which do not effectively alter the pH of the gastric contents, and, since they enhance stomach emptying, their duration of action is shortened by their rapid removal from the stomach. The anticholinergics reduce gastric secretion by blocking the parasympathetic stimuli to the stomach. However, these agents also block the parasympathetic stimuli to many other organs, e.g., the eye, heart, bladder, etc. This additional blocking is often manifested by undesirable side effects such as blurred vision, urinary retention, and the like. Thus, the search for improved agents for treating peptic ulcers continues.

One class of compounds which is useful in the treatment of peptic ulcers is the anti-secretory agents. Such compounds reduce the volume and acidity of gastric secretion through mechanisms other than the blockade of the cholinergic system. The present invention provides such compounds.

The compounds of this invention are represented by the formula

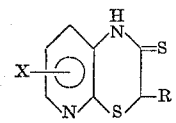

wherein X is hydrogen, hydroxy, mercapto, lower alkyl, lower alkoxy or halo and R is hydrogen, hyroxy, lower-alkoxy, lower alkoxy or halo.

The term "lower alkyl" as used herein refers to both straight and branched chain $C_1$–$C_6$ alkyls including methyl, ethyl, N-propyl, iso-propyl, N-butyl, sec-butyl, tert-butyl, N-pentyl, iso-pentyl, neo-pentyl, N-hexyl and the like.

The term "lower alkoxy" refers to $C_1$–$C_3$ alkoxy groups, including methoxy, ethoxy and propoxy.

The term "halo" includes chloro, fluoro, bromo and iodo.

Representative compounds include:

1H-pyrido[2,3-b][1,4]thiazine-2(3H)-thione 6- or 7- or 8-chloro-1H-pyrido[2,3-b][1,4]-thiazine-2(3H)-thione
6- or 7- or 8-hydroxy-1H-pyrido[2,3-b][1,4]-thiazine - 2 (3H)-thione
6- or 7- or 8-methyl-1H-pyrido[2,3-b][1,4]-thiazine - 2 (3H)-thione
3,6- or 7,8-dimethyl-1H-pyrido[2,3 - b][1,4]thiazine - 2 (3H)-thione
3-n-propyl-1H-pyrido[2,3-b][1,4]thiazine-2(3H)-thione
6- or 7- or 8-methoxy-1H-pyrido[2,3-b][1,4]-thiazine - 2 (3H)-thione The compounds of this invention exhibit anti-secretory activity in test animals and are useful in treating peptic ulcers by reducing the rate of gastric secretion when administered to ulcer patients in dosages of 1–10 mg./kg. of body weight daily. The anti-secretory activity of the compounds was established using the modified pylorus-ligated rat technique. [Shay et al., Gastroenterology, 26, 906 (1954) and Meyer et al., J. Med. Chem., 8, 515 (1965).] The presently preferred compound is 1H-pyrido [2,3-b][1,4]thiazine-2(3H)-thione. The compound has an $ED_{50}$ of approximately 1.2 mg./kg. and is unexpectedly five times as potent as the corresponding oxygen-containing compound, 2,3-dihydro-1H-pyrido[2,3-b][1,4] - thiazine-2-one.

In addition to the anti-secretory activity, the compounds of this invention exhibit anti-inflammatory activity at dosages off rom 10 to 100 mg./kg. The anti-inflammatory activity was established in the carrageenin rat paw edema test [Winter et al., Proc. Soc. Exp. Biol. Med., 111, 544 (1962)]. The compounds are generally administered in single or divided doses over a period of 24 hours to provide symptomatic relief of inflammation and its concomitant pain, swelling, tenderness, etc.

Generally speaking, the compounds (II) of this invention are prepared by reacting the corresponding 2,3-dihydro-1H-pyrido[2,3-b][1,4]thiazine - 2 - ones (I) with $P_2S_5$ in the presence of pyridine and heat. According to the following reaction sequence:

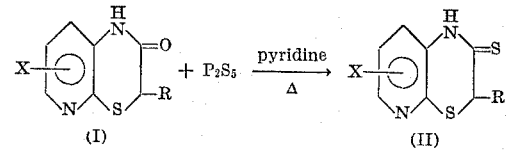

The compounds of Formula I are prepared according to the methods disclosed in U.S. Pat. No. 3,546,220.

The following example further illustrates this invention:

EXAMPLE 1

Preparation of 1H-pyrido[2,3-b][1,4]thiazine-2(3H)-thione 16.6 g. (0.1 mole) of 2,3-dihydro-1H-pyrido[2,3-b][1, 4]-thiazine-2-one and 16.6 g. (0.075 mole) of $P_2S_5$ were stirred in 200 ml. of pyridine at reflux temperature overnight. The resulting dark pyridine solution was decanted from a heavier syrup and concentrated in vacuo. The residue was crystallized from hot 1-butanol with filtration to yield 14.4 g. of crude product, M.P. 229–231° dec. The product sinters above 220°. Recrystallization from butanol and drying in vacuo at 80° yielded the product, M.P. ~225° dec.

Analysis.—Calcd. for $C_7H_6N_2S_2$ (percent): 46.16; H, 3.32; N, 15.37; S, 35.18. Found (percent): C, 46.24; H, 3.17; N, 13.69; S, 36.70. IR and NMR data confirmed the identity of the compound.

While the compound can be administered alone, that is, as the sole component in a filled capsule, it is preferred to formulate the compound in various dosage forms for oral administration such as tablets, syrups and the like. Such dosage forms are prepared by methods well known in the art and generally include a pharmaceutically acceptable carrier or diluent such as lactose, starch or sucrose along with lubricating agents such as magnesium stearate and flavoring and sweetening agents and the like.

We claim:
1. A compound of the formula

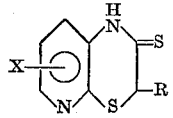

wherein X is hydrogen, hydroxy, mercapto, lower alkyl, lower alkoxy or halo and R is hydrogen, hydroxy, loweralkyl, loweralkoxy or halo.

2. A compound in accordance with claim 1, 1H-pyrido[2,3-b][1,4]thiazine-2(3H)-thione.

References Cited

UNITED STATES PATENTS 3,546,220   12/1970   Stein et al. _____ 260—243

JOHN M. FORD, Primary Examiner

U.S. Cl. X.R.

424—246